United States Patent [19]
Davies et al.

[11] Patent Number: 5,819,111
[45] Date of Patent: Oct. 6, 1998

[54] SYSTEM FOR MANAGING TRANSFER OF DATA BY DELAYING FLOW CONTROLLING OF DATA THROUGH THE INTERFACE CONTROLLER UNTIL THE RUN LENGTH ENCODED DATA TRANSFER IS COMPLETE

[75] Inventors: David A. Davies, Menlo Park; Gary M. Green, Campbell, both of Calif.

[73] Assignee: Adobe Systems, Inc., San Jose, Calif.

[21] Appl. No.: 619,819

[22] Filed: Mar. 15, 1996

[51] Int. Cl.⁶ .................................................. G06F 13/00
[52] U.S. Cl. ........................................... 395/849; 395/873
[58] Field of Search ................................. 370/418, 415, 370/416, 201, 445; 395/873, 310, 849

[56] References Cited

U.S. PATENT DOCUMENTS

| | | | |
|---|---|---|---|
| 4,298,954 | 11/1981 | Bigelow et al. ........................ | 395/873 |
| 4,819,229 | 4/1989 | Pritty et al. ............................ | 370/445 |
| 5,079,762 | 1/1992 | Tanabe .................................. | 370/418 |
| 5,083,269 | 1/1992 | Syobatake et al. .................... | 711/100 |
| 5,126,999 | 6/1992 | Munter et al. ......................... | 370/415 |
| 5,130,975 | 7/1992 | Akata .................................... | 370/416 |
| 5,163,132 | 11/1992 | DuLac et al. .......................... | 395/873 |
| 5,406,554 | 4/1995 | Parry ..................................... | 370/58.1 |
| 5,502,822 | 3/1996 | Takebe .................................. | 395/310 |
| 5,619,689 | 4/1997 | Kelly ..................................... | 370/201 |

FOREIGN PATENT DOCUMENTS 0 602 667 A1   6/1994   European Pat. Off. ................... 13/42

*Primary Examiner*—Thomas C. Lee
*Assistant Examiner*—David Ton
*Attorney, Agent, or Firm*—Fish & Richardson P.C.

[57] ABSTRACT

A method implemented in a computer peripheral having an IEEE 1284 interface controller for managing the transfer of data to the interface controller includes detecting a condition requiring the computer peripheral to control the flow of transfer of data to the interface controller and if a run length encoded data transfer to the interface controller is pending, delaying the control of flow of the transfer of data until a RLE data byte associated with the end of the pending run length encoded data transfer is received by the interface controller.

12 Claims, 8 Drawing Sheets

SYSTEM FOR MANAGING TRANSFER OF DATA BY DELAYING FLOW CONTROLLING OF DATA THROUGH THE INTERFACE CONTROLLER UNTIL THE RUN LENGTH ENCODED DATA TRANSFER IS COMPLETE

BACKGROUND OF THE INVENTION

The present invention relates generally to methods and apparatus for transferring data between a host computer and a peripheral device, and more particularly, to an IEEE 1284 compatible peripheral interface including delay mechanism for delaying the flow controlling of communications between peripheral device and host computer during run length encoded data transfers.

The IEEE 1284 standard entitled "Standard Signaling Method for a Bidirectional Parallel Peripheral Interface For Personal Computers" is a signaling method for bidirectional parallel communication between a host computer (such as PC) and a peripheral device. The IEEE 1284 standard includes a number of communication modes for transferring data between the host computer and the peripheral device.

The base mode, known as the compatibility mode, is entered at initialization and is backward compatible with the standard PC parallel port.

A second mode, known as enhanced compatibility port (ECP) mode, is an optional mode of operation for an IEEE 1284 compliant device. In addition to supporting bidirectional byte data transfers, the ECP mode supports two advanced features to improve the effectiveness of the protocol for some applications. These are channel addressing and run length encoded (RLE) data compression. In ECP mode, each byte transferred can either be a command or data. The command can be either a channel address command or an RLE command.

Channel addressing provides up to 128 logical forward and reverse channels in the communications link between the host computer and the peripheral device. A channel may be dynamically changed while in ECP mode. The channel address for host computer to peripheral device and peripheral device to host computer communication defaults to zero after each negotiation from the compatibility mode into ECP mode. Thereafter a channel address command may be issued by the host computer to change the channel address for both host to peripheral and peripheral to host communications. The channel address will remain set to the designated channel until the host computer issues a different channel address or until the host terminates ECP mode.

A run length encoded sequence consists of a command (count) byte followed by a data byte. The count byte contains information about the count or number of data bytes that are to be reproduced. When a RLE count byte is received, the next byte (the data byte) is replicated, by a decompression engine in the IEEE 1284 communications interface of the peripheral device. The number of times the data byte is replicated is specified by the count byte. For example, if an RLE count byte of nine is received by the peripheral device, then the data byte that follows the count byte is replicated nine times by the decompression engine for a total of ten data bytes to be used or stored by the peripheral device.

For example, a host computer may desire to send a sequence of bytes associated with an image to a peripheral device such as a printer for processing (printing). In this example, each byte in the transfer from the host is associated with a pixel in the image. A portion of the image may include blank sections or a shaded region where the same value data byte is to be transmitted from the host to the peripheral device repetitively. Run length encoding allows for the transmission of a count and a single data byte, as opposed to a continuous sequence of the same data byte value.

The IEEE 1284 standard defines bidirectional data transfers between the host and the peripheral. When data is transferred from the host to the peripheral, the peripheral processes the data received through the IEEE 1284 interface. The processing, or consumption, is performed by a central processing unit in the peripheral. Occasionally the central processing unit will be unable to process incoming data as fast as it is provided. Typically, the peripheral device includes a buffer which the peripheral uses to temporarily store incoming data prior to processing by the central processing unit. However, occasionally this buffer may become full, resulting in the inability of the peripheral device to receive or process new incoming data.

As part of the IEEE 1284 interface standard, a host transfer recovery (HTR) cycle is defined that allows the host computer to recovery from a stalled forward communication link to the peripheral device. A stalled condition may arise when the peripheral device is unable to accept a data byte being transferred or is unable to acknowledge receipt of a data byte in a timely fashion (send an acknowledgment signal). A HTR cycle may be initiated if the peripheral fails to acknowledge a data transfer from the host computer within 35 milliseconds from the time the transfer from the host computer was initiated.

The HTR cycle allows for the easy recovery by a host computer from a stalled forward channel transmission. However, the ability of the host computer to generate the HTR cycle at any time (after the 35 ms timeout has occurred) creates problems for the programming of peripheral devices. These arise from the uncontrolled nature of the termination of the forward transfer from the peripheral device's perspective. One such problem arises if the HTR cycle occurs on an RLE data byte.

As is described above, RLE transfers consist of a count byte and a data byte. If the HTR cycle arises during a data byte transfer for an RLE encoded transfer, then the HTR cycle will result in the host resending the data byte to the peripheral device as part of the recovery. This is because the last data byte that was transmitted (the byte that was not timely acknowledged, or that resulted in the forward stall) is the next byte transmitted by the host in the ECP mode after a HTR cycle.

A problem arises in the handling of this extra data byte. As was described above, this byte will be sent as the next byte transmitted in ECP mode. However, the host is not constrained to remain in ECP mode after a HTR cycle. For example, the host may enter the compatibility mode after the HTR cycle and wish to transfer other data to the peripheral device. Thus, the peripheral device must be prepared to receive new data, yet also be prepared to receive the extra data byte associated with the interrupted RLE transfer the next time the host enters ECP mode. In addition, the peripheral must decide what to do with the partially decompressed data that was received prior to the HTR cycle. This results in numerous data management problems for the peripheral device, necessitating extra storage and complicated recovery schemes.

The problem becomes even more difficult when the HTR cycle occurs on an RLE data byte and is followed by a forward channel address change. A host may issue a channel address command after an HTR has occurred on an RLE data byte. As was described above, the next time the host switches to the channel that was the subject of the interrupted RLE data transfer, the first byte transferred in the forward direction would be the data byte of the RLE command that experienced the HTR cycle. Accordingly, a peripheral device needs to handle HTR cycle recoveries on a per-channel basis, so that when the host returned to that channel, the peripheral would interpret the first byte as the data portion for the run length encoded command that did not complete earlier.

Providing the required functionality results in a complicated manipulation of data by the peripheral device in order to accommodate the HTR cycles generated by the host computer. Accordingly it would be desirable to provide methods and apparatus for reducing the complexity of programming on the peripheral side of an IEEE 1284 interface.

SUMMARY OF THE INVENTION

In one aspect of the invention, a method implemented in a computer for managing the receipt of data through an IEEE 1284 interface controller, includes transferring data received by the interface controller to a first of a plurality of small capacity buffers and transferring a data block from the first buffer to a larger capacity buffer for processing by the computer peripheral while transferring further data received by the interface controller during the data block transfer to a second of the plurality of small capacity buffers.

Embodiments of the invention include the following features. The method can include after execution of the step of transferring a data block, either setting the interface controller to disable acknowledgment of receipt of data if a flow control status flag indicates pending flow stop; or if not, setting the flow control status flag to indicate pending flow stop if the large capacity buffer has insufficient space to hold one data block from the plurality of small capacity buffers.

The disabling of acknowledgment of receipt of data can be delayed if a run length encoded data transfer is pending until an RLE data byte associated with the end of the pending run length encoded data transfer is received by the interface controller.

In an other aspect of the invention, a method implemented in a computer peripheral having an IEEE 1284 interface controller for managing the transfer of data to the interface controller, includes detecting a condition requiring the computer peripheral to control the flow of transfer of data to the interface controller and if a run length encoded data transfer to the interface controller is pending, delaying the control of flow of the transfer of data until a RLE data byte associated with the end of the pending run length encoded data transfer is received by the interface controller.

In another aspect of the invention, a method of processing data received from a host implementing an IEEE 1284 communications protocol by a peripheral includes receiving data from the host at an interface controller in the peripheral, transferring the data from the interface controller to a first of a pair of buffers having a predetermined capacity and transferring a data block from the first one of the buffers to an input buffer for processing by the peripheral, the input buffer having a larger capacity than the first buffer, while transferring the data received by the interface controller during the data block transfer to a second of the pair of buffers.

Embodiments of the invention include the following features. The input buffer can be checked to determine of it is full just prior to transferring the data block from the first buffer to the input buffer. The checking can include checking a flow control status flag of the peripheral, and if the flow control status flag indicates pending flow stop, disabling data transfers from the host to the peripheral, and if not, determining if the input buffer has sufficient space to hold more than one data block transfer from the interface controller, and if there is insufficient space, setting the flow control status flag to indicate pending flow stop.

The disabling step can include checking if a run length encoded data transfer is pending from the host, and if so, delaying disabling of the data transfers from the host to the peripheral until a data byte associated with the run length encoded data is received by the interface controller.

In another aspect of the invention, a method implemented in a computer peripheral for disabling the transmission of acknowledgment signals upon receipt of data from a host implementing an IEEE 1284 communications protocol by the peripheral includes delaying disabling transmission of the acknowledgment signal if a run length encoded data transfer is pending from the host until receipt of an RLE data byte associated with the pending run length encoded data transfer and transmission of an acknowledgment signal to the host associated with the RLE data byte, whereby the peripheral is prevented from disabling transmission of acknowledgment signals during a pending run length encoded data transfer so as to prevent the necessity for a complicated recovery associated with an interrupted run length encoded data transfer.

In another aspect of the invention, a method of processing run length encoded data received from a host implementing an IEEE 1284 communications protocol by a peripheral, includes receiving run length encoded data including a count byte and data byte from the host, setting a flag in the peripheral upon receipt of the count byte, upon receipt of the data byte, transferring the number of data bytes as indicated by the count byte into a first of a pair of data buffers, having a predetermined capacity, clearing the flag upon transferring a last of the number of data bytes, transferring data from the first data buffer to an input buffer having a larger capacity than the first of the pair of data buffers while loading incoming data from the host into a second of the pair of data buffers after the first is full, and if the input buffer is full, controlling the flow of data transfers from the host to the peripheral.

Embodiments of the invention include the following features. Controlling the flow of data transfers can include checking whether the flag is set indicating a pending run length encoded data transfer and receipt of an RLE count byte, if it is set and an RLE data byte has been received, generating a remaining number of data bytes associated with the RLE data byte as indicated by an associated RLE count byte, if the RLE data byte has not been received, waiting until receipt of the RLE data byte and generating a plurality of data bytes as indicated by the associated RLE count byte, and disabling acknowledgment of receipt of data transfers from the host to the peripheral.

In another aspect of the invention, an apparatus for managing the receipt of data by a peripheral device through an IEEE 1284 interface controller from a host includes a plurality of buffers of a first predetermined capacity for receiving data transferred from the interface controller and a buffer having a higher capacity than each of the plurality for storing data for processing by the peripheral device, and means for transferring a data block from one of the plurality of buffers to the higher capacity buffer when the one of the plurality of buffers is deemed full, while transferring further data received by the interface controller during the data block transfer to a second of the plurality of buffers.

Embodiments of the invention include the following features. The apparatus can include a flow controller for either disabling receipt of data by the peripheral device if a flow control status flag indicates pending flow stop just prior to transferring a data block from the one of the plurality of buffers to the higher capacity buffer, or if not, setting the flow control status flag to indicate pending flow stop if the higher capacity buffer has insufficient space to hold one additional data block from the plurality of buffers.

The apparatus can include a delay mechanism for delaying the disabling of the receipt of data by the peripheral device if a run length encoded data transfer is pending until a data byte associated with the pending run length encoded data is received by the interface controller.

Among other advantages, the use of a delay step prior to disabling acknowledgment of data received from a host assures that a HTR cycle is not initiated during a RLE data transfer. Accordingly, a reduction in the complexity of programming on the peripheral side of an IEEE 1284 interface is realized.

Other advantages and features will become apparent from the following description and from the claims.

BRIEF DESCRIPTION OF THE DRAWINGS

The accompanying drawings, which are incorporated and constitute a part of the specification, schematically illustrate embodiments of the present invention and, together with the general description given above and the detailed description given below, serve to explain the principals of the invention.

DETAILED DESCRIPTION

Figure 1:
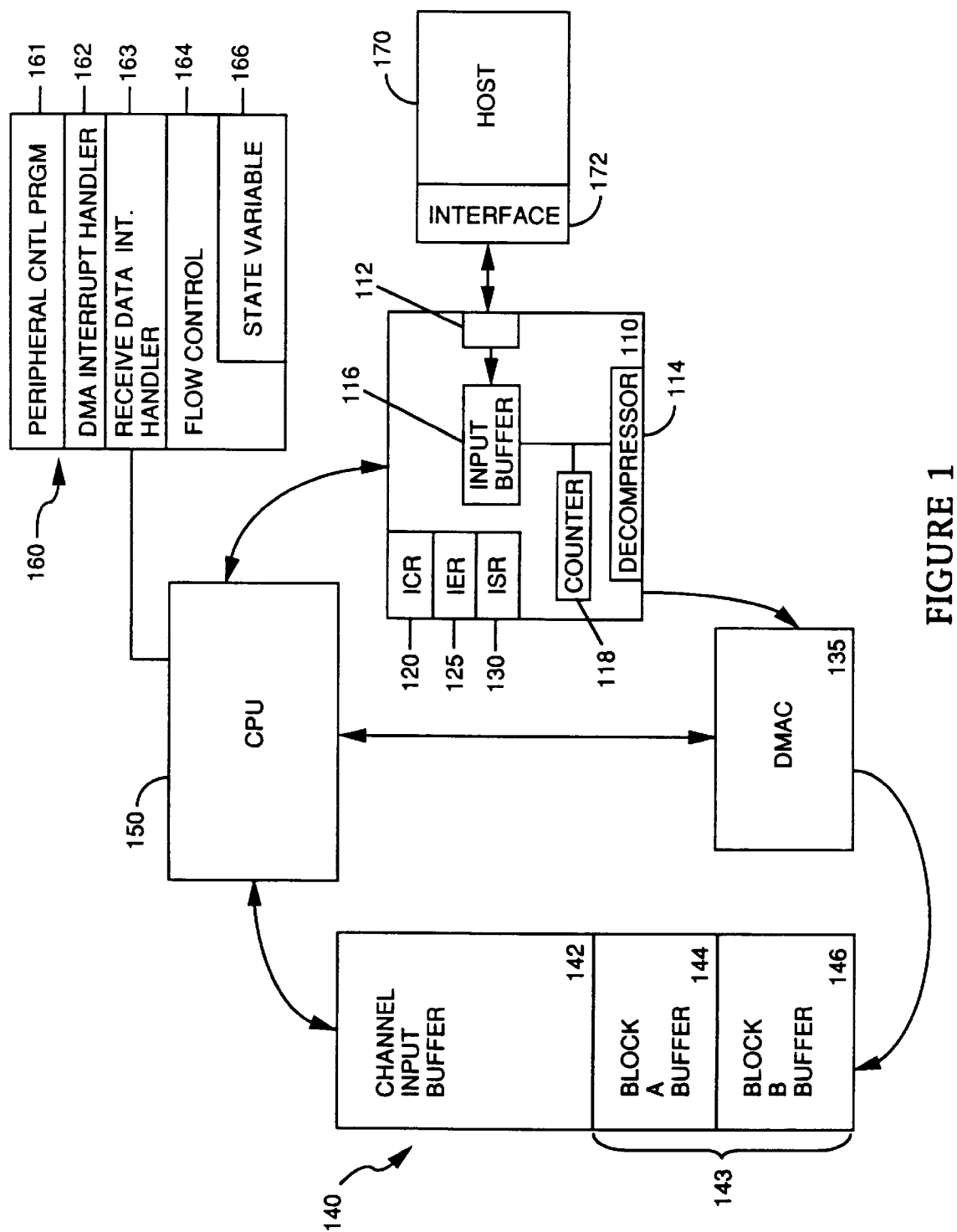
FIG. 1 is a block diagram of a peripheral interface according to an embodiment of the present invention.

Referring to FIG. 1, peripheral interface 100 includes an IEEE 1284 controller 110, a direct memory access controller (DMAC) 135, a memory 140, and central processing unit (CPU) 150.

IEEE 1284 controller 110 includes a communications port 112 for communicating with a host computer 170 over an IEEE 1284 compatible interface 172. In addition, IEEE 1284 controller includes a RLE decompressor 114, input buffer 116, RLE counter 118 and three registers: interrupt control register (ICR) 120, interrupt enable register (IER) 125, and interrupt status register (ISR) 130.

Figure 2:
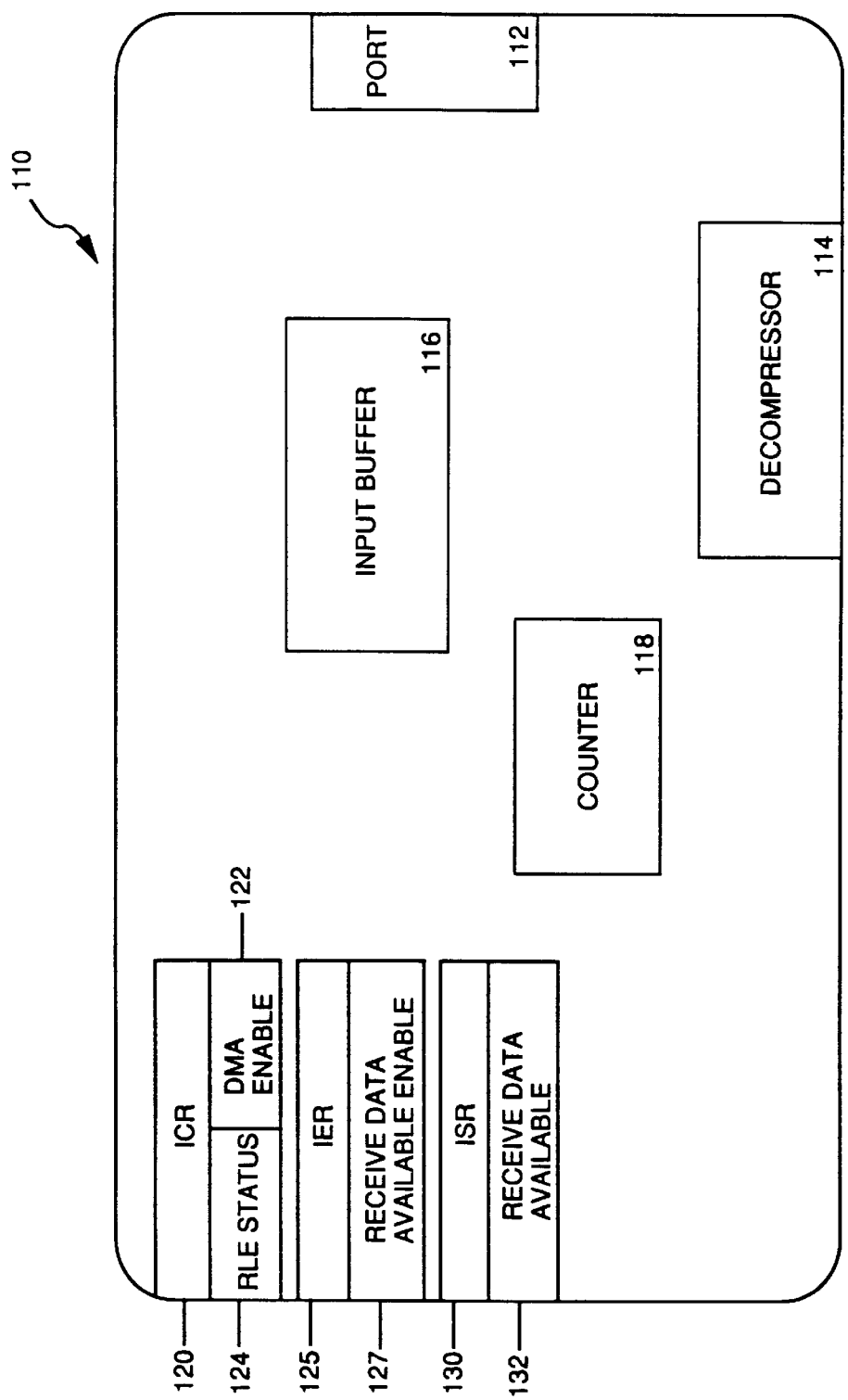
FIG. 2 is a block diagram of a IEEE 1284 controller according to an embodiment of the present invention.

Referring to FIG. 2, ICR 120 includes a direct memory access (DMA) receive enable bit 122, which enables the assertion of a hardware signal to DMAC 135 requesting a data transfer from IEEE 1284 controller 110 to DMAC 135. When this bit is set to zero, incoming peripheral direct memory access data transfers will stop. Alternatively, when set to one, forward data transfers are enabled.

In addition, ICR 120 includes an RLE status bit 124, which indicates the current state of RLE decompressor 114. When this bit is set, an RLE data transfer is currently in the process of being decompressed by RLE decompressor 114.

IER 125 includes a receive data available enable bit 127. When it is set to one, CPU 150 will be interrupted when a byte is received. Alternatively, when it is set to zero and DMA receive enable bit 122 is set to zero, IEEE 1284 controller 110 will not acknowledge receipt of any bytes transmitted from host computer 170.

ISR 130 indicates the availability of data from the host. ISR 130 includes a receive data available status bit 132, which, when set to 1, indicates host computer 170 has written data to peripheral interface 100. Upon a read of data input register 116, receive data available status bit 132 is automatically reset to zero.

Referring again to FIG. 1, data input register 116 receives the data transferred by host computer 170 to peripheral interface 100. The register is one byte in length. A read of the data input register 116 by DMAC 135 or CPU 150 clears the receive data available status bit 132 and generates an acknowledgment signal for transmission back to the host computer 170.

RLE counter 118 contains the number of bytes remaining to be decompressed and transferred from the IEEE 1284 controller 110 to memory 140. When a RLE count byte is received from the host, it is transferred to RLE counter 118 for storage and manipulation as part of an RLE transfer. Acknowledgment of receipt of the RLE count byte (in the form of an acknowledgment signal) is sent to host computer 170 when RLE count byte is transferred to RLE counter 116 (assuming DMA receive enable bit 122 or receive data available enable bit 127 are enabled). RLE counter 116 is sized to store a count value associated with the longest permissible RLE data transfer (in bytes) from host computer 170. In one embodiment, the register is seven bits in length and stores a binary number associated with the bytes remaining, minus one, to be decompressed and transferred from IEEE 1284 controller 110 to memory 140 via DMAC 135. For example, if a binary one is stored in RLE counter 118 while RLE status bit 124 of ICR 120 is set to one, then two bytes need to be decompressed by RLE decompressor 114. A read of the RLE counter 118 by CPU 150 will reset RLE status bit 124 from one to zero.

To achieve maximum data throughput, direct memory access (DMA) is used to transfer data bytes from IEEE 1284 controller 110 in peripheral interface 100 into memory 140. DMA is a process for reading data from the IEEE 1284 controller and writing it directly to memory without CPU intervention. DMAC 135 is dynamically programmed to transfer a specified number of bytes (transfer size) from IEEE 1284 controller 110 to a specified memory region in memory 140. DMAC 135 interrupts CPU 150 when the specified number of transfers have been completed. This relieves CPU 150 in the peripheral device from the burden of actual data transfer between the IEEE 1284 controller 110 and memory 140. In one embodiment, the transfer size is defined as one block of data which equals 128 bytes. The transfer size of 128 bytes corresponds to the maximum size of a run length encoded data transfer from host computer 170 with a seven-bit count field.

Memory 140 includes a channel input buffer 142, and a plurality of block buffers 143. In one embodiment, two block buffers are used, block A buffer 144 and block B buffer 146. Channel input buffer 142 is a generic input stream data buffer area. Block buffers 143 are sized to be at least as large as the length of the largest possible run-length encoded data transfer provided by host computer 170. In one embodiment, the block buffers are sized to be 136 bytes in length. The selection of 136 bytes for the length was driven by the use of a particular CPU which included a built in DMAC controller (Intel I9600a RISC based processor).

Connected to CPU 150 is a non-volatile storage device 160 for storing peripheral control programs 161, DMA interrupt handler 162, receive data interrupt handler 163, flow control program 164, and flow control state variable 166. Storage device 160 may be a random access memory (RAM) or a combination of RAM and read only memory (ROM). Peripheral control programs 161 are executable by CPU 150 for controlling peripheral interface 100. Flow control state variable 166 is a flag that can be set to any one of three states: flow on, pending stop, or flow off.

The flow on state indicates that the channel input buffer 142 is not full and is not in the process of being shut down. The pending stop state indicates that after the last load of a data block from a block buffer 143 to channel input buffer 142, the channel input buffer was determined to be full. When channel input buffer 142 is full, at the next interrupt from DMAC 135 to CPU 150, the peripheral interface will be flow controlled. In one embodiment, the channel input buffer is deemed full when it has insufficient space to store a full data block transfer from one of block buffers 143. Alternatively, the channel input buffer may be deemed full when it has insufficient storage space to receive two full blocks of data from one of block buffers 143. The flow off state indicates that the peripheral interface is no longer receiving data from the host.

Forward Data Transfers

CPU 150 executes peripheral control programs 161 in order to process data associated with the transfers from host computer 170. In operation, the host computer transfers data to peripheral interface 100 through communications port 112 in IEEE 1284 controller 110. IEEE 1284 controller 110 receives data at its data input register 116, setting received data available status bit 127 in interrupt status register 125 indicating that data is available to be read. If DMA receive enable bit 122 is set, then a DMA request for data transfer from IEEE 1284 controller 110 is sent to DMAC 135.

DMAC 135 reads the input data from data input register 116 and writes the data to a first one of block buffers 143 (either block A buffer 144 or block B buffer 146) in memory 140. This process of single byte transfers via DMAC 135 continues until the block buffer which is receiving the data is full. Assuming for the purposes of this discussion that block A buffer 144 has been filled by the DMAC byte transfers, DMAC 135 sends an interrupt to DMA interrupt handler 152 in CPU 150 indicating that block A buffer 144 is full.

DMA Interrupts and Flow Control

Figure 3:
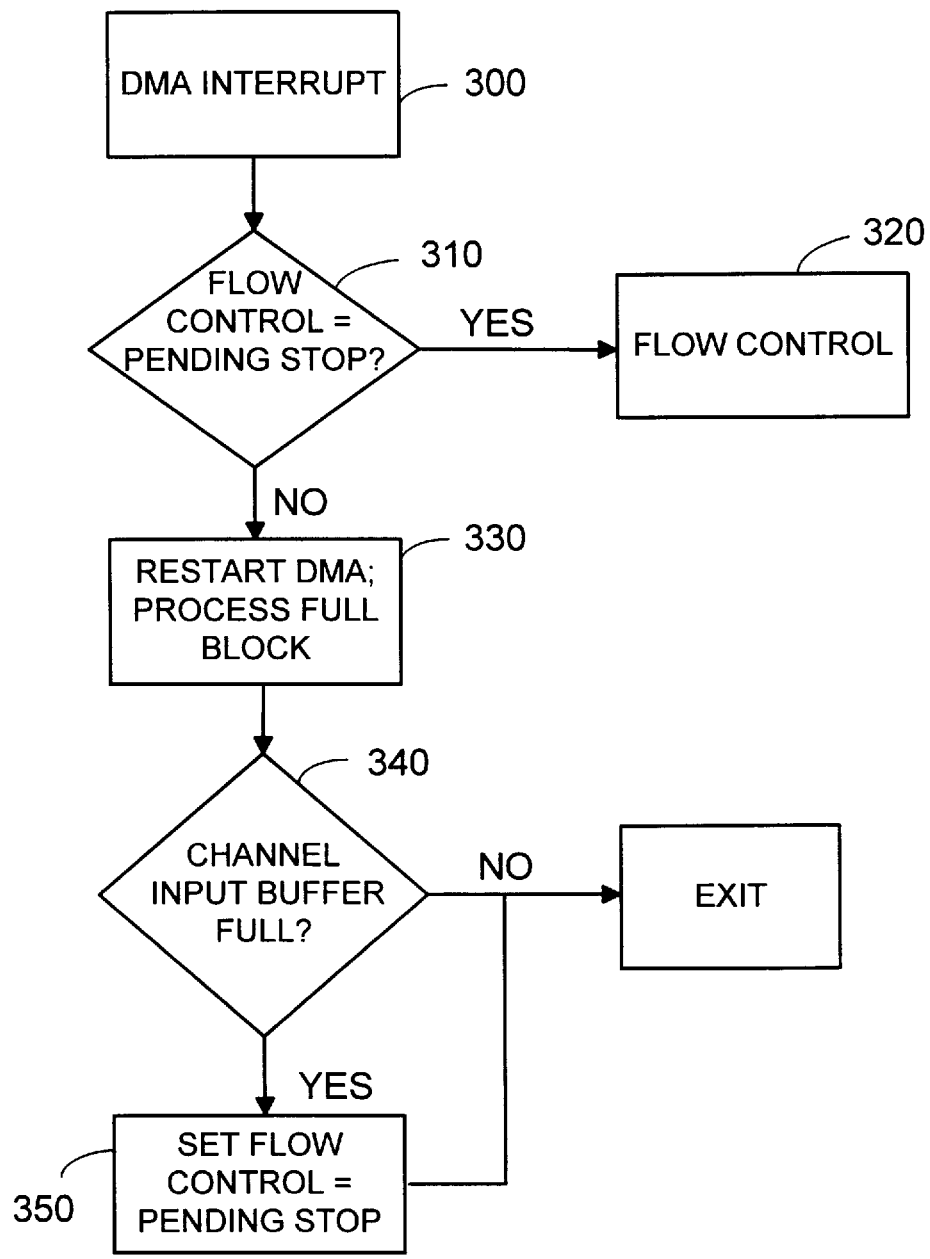
FIG. 3 is a flow diagram of a DMA interrupt sequence according to an embodiment of the present invention.

Referring to FIG. 3, when CPU 150 receives an interrupt (300) from DMAC 135 that block A buffer 144 is full, CPU 150 checks (310) the status of flow control state variable 166. If the flow control state variable is set to pending stop, then a flow control procedure is initiated (320). The description of the flow control procedure will be described in greater detail below in reference to FIG. 4.

If the flow control state variable is not in the pending stop state, then CPU 150 restarts (330) the DMA process enabling DMAC 135 to fill the second block buffer 143 in memory 140 (here block B buffer 146). CPU 150 also transfers the data from the full block buffer (block A buffer 144) to channel input buffer 142.

After the transfer of data from the block buffer to channel input buffer 142, CPU 150 checks (340) to see if channel input buffer 142 is deemed full. If so, then CPU 150 sets (350) flow control state variable 166 to the pending stop condition, completing this portion of the CPU operations (exit the routine). If not, CPU exits the routine, leaving the flow control state variable 166 unchanged. This completes the processing for DMA interrupt handler 161 until the next interrupt is received by CPU 150 from DMAC 135.

Peripheral Interface Flow Control

Figure 4:
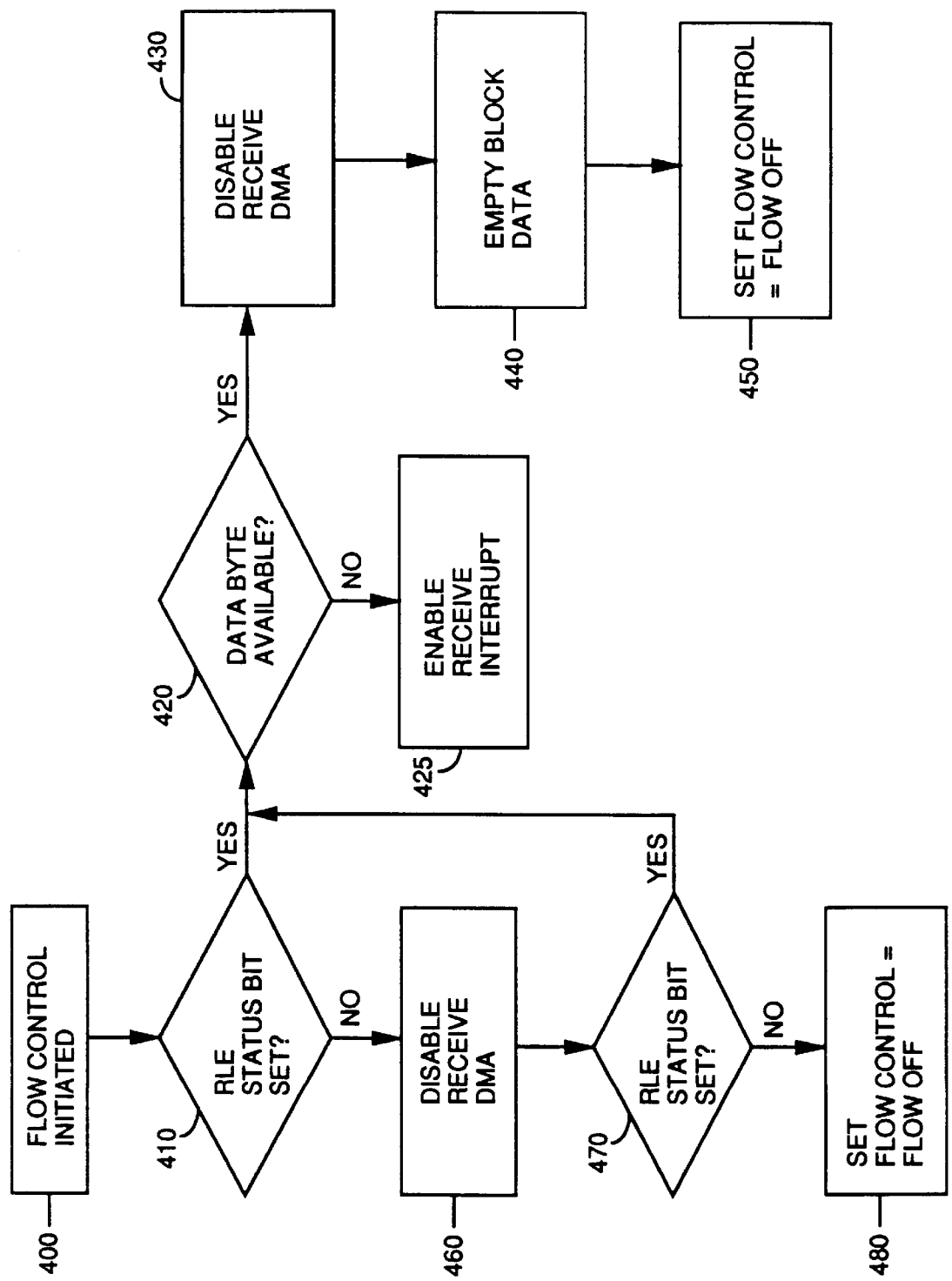
FIG. 4 is a flow diagram of a flow control sequence according to an embodiment of the present invention.

Referring to FIG. 4, the flow control procedure is initiated (400) as part of a CPU 150 response to a full condition in channel input buffer 142. The status of the various buffers and registers in peripheral interface 100 is as follows: 1) one of the block buffers, assuming for the purposes of this discussion, block A buffer, is empty, having had its data transferred to channel input buffer 142 as part of the previous DMA interrupt handler process; 2) the second block buffer (in this case block B buffer 146) is full and is awaiting transfer of its data to channel input buffer 142; 3) the channel input buffer has been determined to be full (insufficient room to receive one or more data blocks from a block buffer, depending on the definition of the term full for the given embodiment); 4) IEEE 1284 controller data input register 116 may be empty or contain a last data byte received from host computer 170; 5) RLE counter 118 may be empty or contain an RLE count byte for a pending RLE data transfer. At this time, DMAC 135 is shut down and is not loading data from IEEE 1284 controller to block buffers 143 (because it has not been re-enabled by CPU 150).

The flow control procedure begins by CPU 150 checking (410) the status of RLE status bit 124 in the interrupt control register 120. As was described previously, the state of this bit determines if the interface is actively performing an RLE decompression at the present time. (The value of the RLE status bit is set to one as soon as the transfer of an RLE command byte count has been received from host computer 150.)

If RLE status bit 124 is set to one, then CPU 150 determines if the data portion of the RLE sequence has arrived from host computer 170. This is accomplished by checking (420) received data available status bit 132 in interrupt status register 130. If received data available status bit 132 is set, then the data associated with the run length encoded data transfer from the host has been received by IEEE 1284 controller 110. CPU 150 then disables (430) DMA receive enable bit 122 to stop DMA data transfers by DMAC 135. Thereafter CPU 150 completes the decompression of the run length encoded data (440) by reading the count information from RLE counter 118 and the data byte from data input register 116.

Specifically, the CPU 150 will complete the decompression in software and transfer, a byte at a time, the data into an empty block buffer (in this case block A buffer 144). Thereafter, CPU 150 sets (450) flow control state variable 166 to flow off, indicating to itself that peripheral interface 100 is no longer accepting data from host computer 170. The host computer's only indication that the peripheral interface 100 is no longer accepting data is the lack of a timely acknowledgment signal from the peripheral interface 100.

In the event that the received data (data byte from the pending run length encoded data transfer) is not available in IEEE 1284 controller 110, CPU 150 sets (425) receive data available enable bit 127 in interrupt enable register 125, so that when the data portion of the pending RLE sequence arrives, the flow control process may continue.

Figure 5:
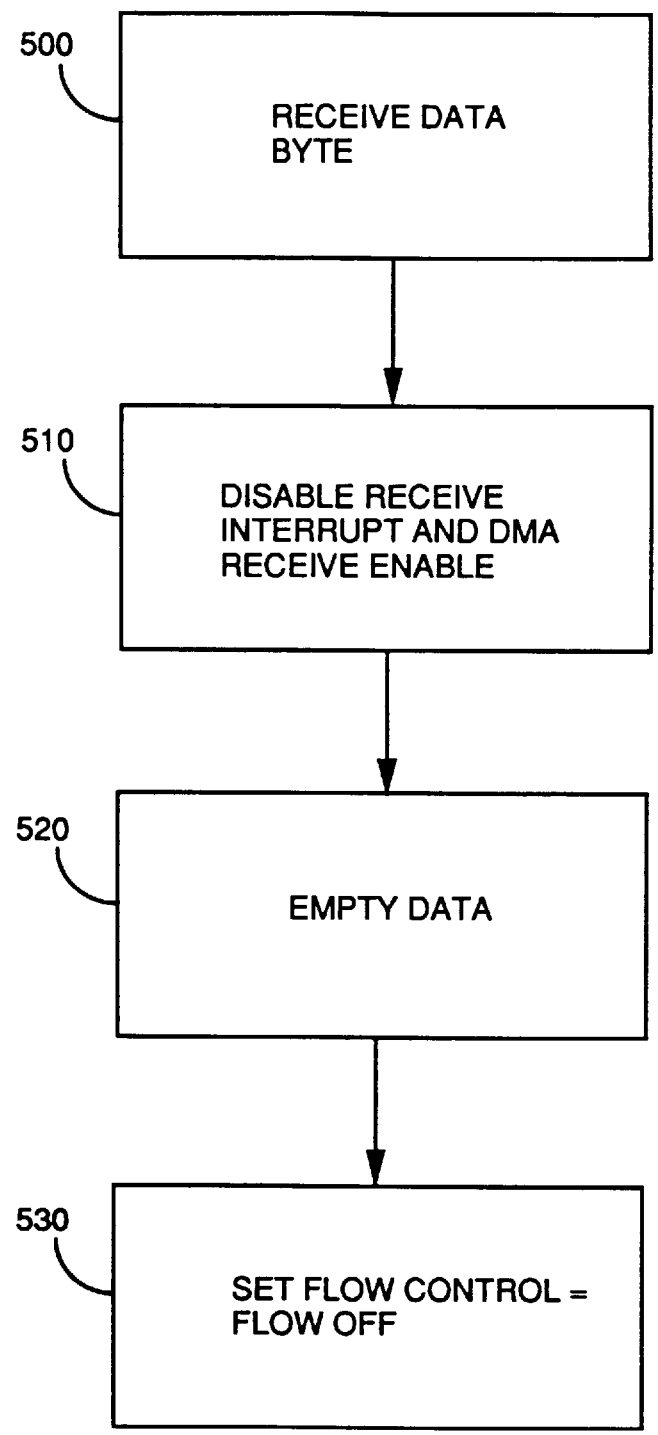
FIG. 5 is a flow diagram of a receive data interrupt sequence according to an embodiment of the present invention.

Referring to FIG. 5, when CPU 150 receives (500) the interrupt that the data associated with the RLE transfer has been received by IEEE 1284 controller 110, then CPU 150 disables (510) receive data available enable bit 127 and DMA receive enable bit 122, effectively disabling the peripheral interface from receiving and processing new data from the host computer. Thereafter, CPU 150 performs the run length encoded data decompression (520) of the data byte and then sets (530) flow control state variable 166 to flow off.

Referring back to FIG. 4, in the event RLE status bit 124 is not set (at step 410), then CPU 150 disables (460) DMA receive enable bit 122 in interrupt control register 120 reflecting the current status of data flow in the peripheral 100, namely, that DMA transfers from IEEE 1284 controller 110 to memory 140 by DMAC 135 are not being processed. After DMA receive enable bit 122 is cleared, then CPU 150 checks (470) the status of RLE status bit 122 in interface control register 120 a second time in order to assure that a RLE count byte has not been received subsequent to the disabling of the DMA transfers.

If RLE status bit 122 has been set, then decompression of the RLE data is performed as was described above in steps 420 through 450. Alternatively, if RLE status bit 122 has not been set, then flow control state variable 166 is set (480) to flow off. The peripheral interface 100 will no longer process data from host computer 170 until a restart.

Restart

Figure 6:
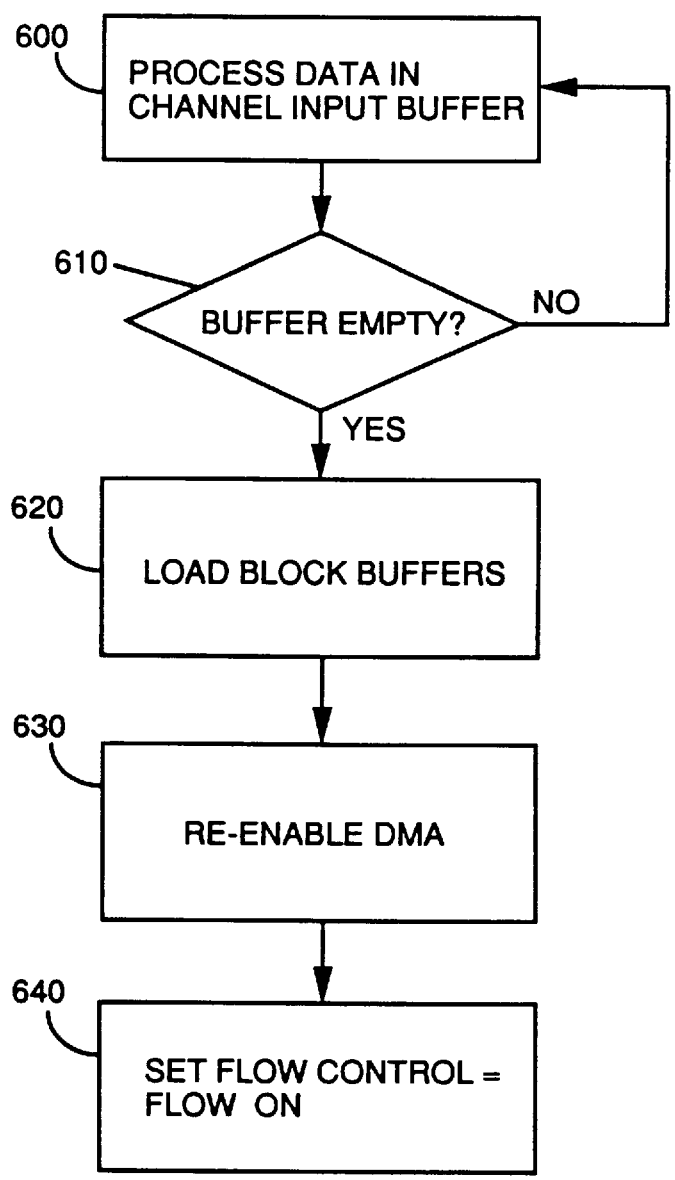
FIG. 6 is flow diagram of a restart procedure according to an embodiment of the present invention.

Referring to FIG. 6, concurrent with the flow control process execution, CPU 150 consumes (600) (processes) data blocks stored in channel input buffer 142. Once the CPU has processed a sufficient number of data blocks from the channel input buffer 142, then the peripheral interface may be turned back on. CPU 150 checks (610) after each data block in channel input buffer 142 is processed, to determine if channel input buffer 142 has sufficient room to restart. In one embodiment, restart commences when a majority of channel input buffer 142 is empty. In another embodiment, restart commences when channel input buffer 142 is ten percent full (ninety percent empty).

If channel input buffer is not sufficiently empty, then CPU 150 processes the next data block in the channel input buffer.

If channel input buffer 142 is sufficiently empty, then CPU 150 loads (620) the data from all the full block buffers 143 into channel input buffer 142. Thereafter, CPU 150 re-enables (630) DMA receive enable bit 122 in interrupt control register 120, and sets (640) the flow control state variable 166 to flow on. The peripheral interface is now ready to receive and process data from host computer 170.

Alternative Embodiments

Figure 7:
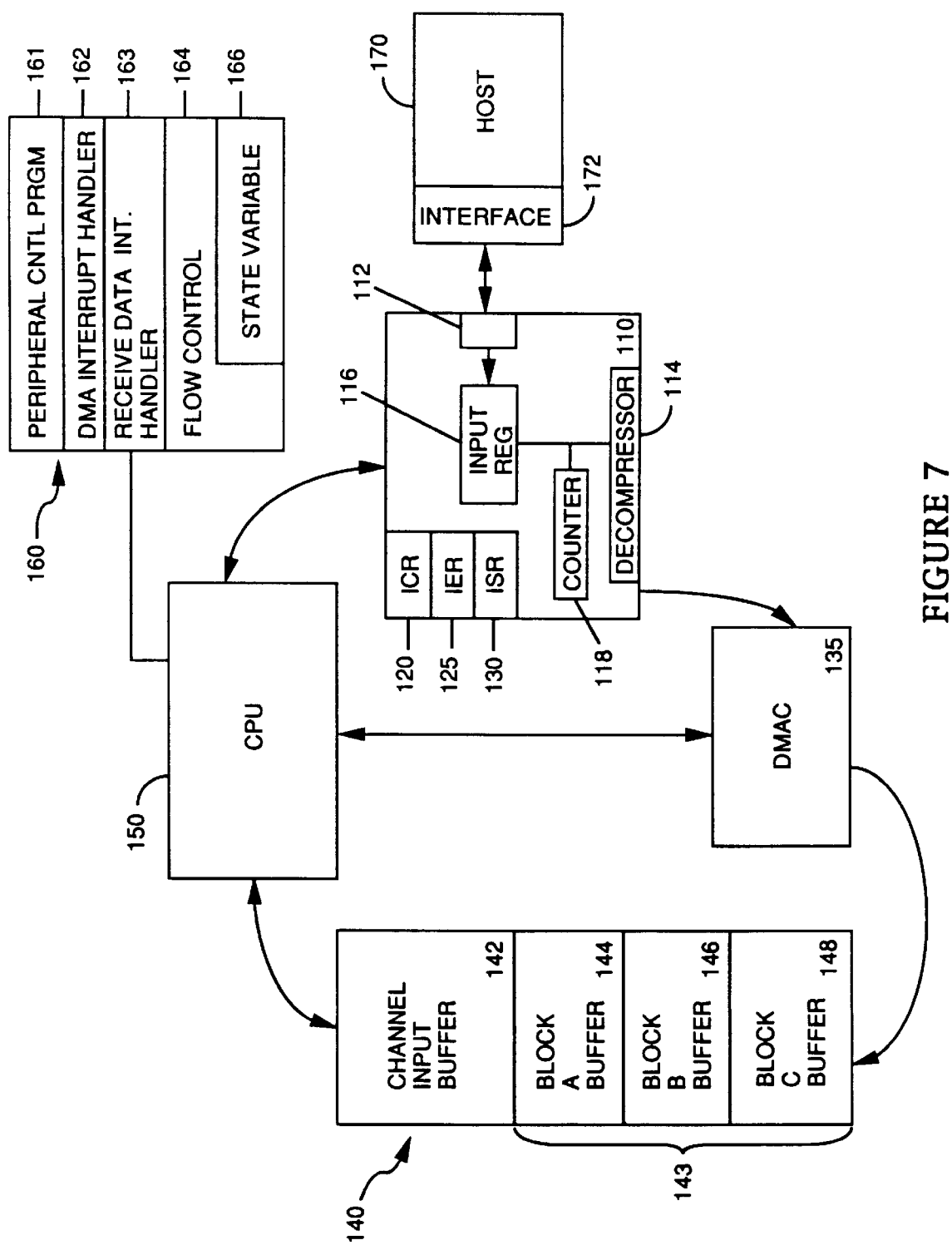
FIG. 7 is a block diagram of a peripheral interface according to an alternative embodiment of the present invention.

Referring to FIG. 7, in an alternative embodiment, a third block buffer 143 is available for loading by DMAC 135. The third block buffer, block C buffer 148, is loaded and transfers data in the same fashion as the two other block buffers, block A buffer 144 and block B buffer 146. The block buffers are loaded in round-robin fashion by DMAC 135. With a three block buffer configuration, one buffer is selected to accept data from DMAC 135, one buffer is available for processing and unloading of data by DMA interrupt handler 152, and one buffer is empty.

The three block buffer configuration allows for a variation in the flow control procedure. Specifically, after a block of data is loaded from a block buffer to channel input buffer 142, a determination is made whether or not the channel input buffer is full. In a three buffer configuration, full is defined as insufficient space in channel input buffer 142 to store a full block of data from a block buffer 143.

Figure 8:
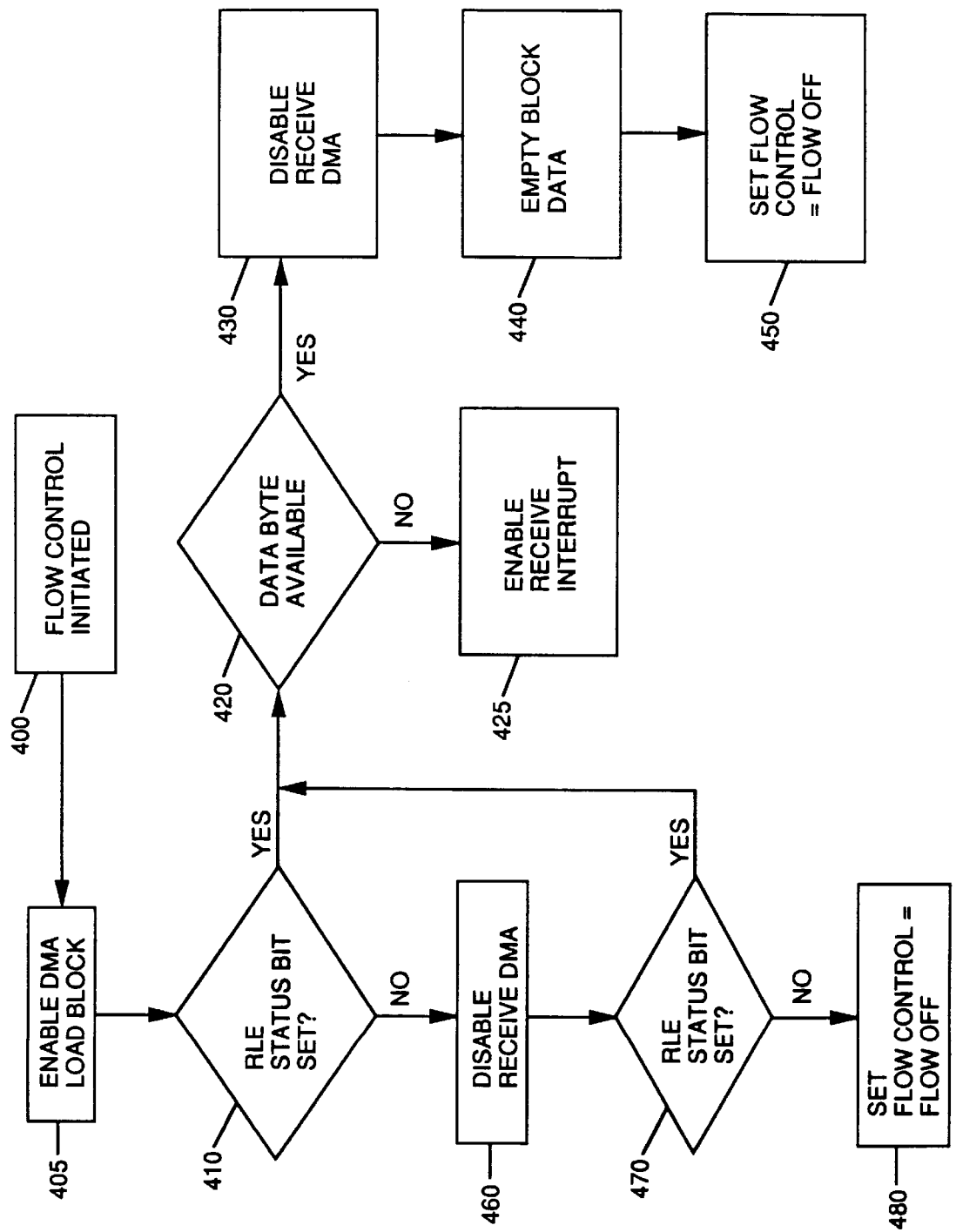
FIG. 8 is a flow diagram of a flow control procedure according to an alternative embodiment of the present invention.

Referring to FIG. 8, with the three block buffer configuration, the flow control process reenables DMAC 135 and loads a data block from a full block buffer 143 which was the source of the most recent DMA interrupt to CPU 150. Specifically, if flow control state variable 166 is set to pending flow stop and CPU 150 has received an interrupt indicating another block buffer is full and ready for processing, DMAC 135 is enabled (405) allowing the next block buffer to fill. The flow control procedure continues as was previously described, allowing for the simultaneous processing of incoming data while the flow control procedure runs its course. In a worse case scenario after a complete interface shut down (DMAC 135 disabled), one block buffer will be filled with "old" data (data that could not be loaded into channel input buffer 142 because it was full), a second block buffer will be full of data received from host computer 170 during the flow control procedure, and the third block buffer will be full of run length encoded data which has been expanded by CPU 150 (resulting from a run length encoded data transfer request that was pending when the peripheral interface was shutting down).

In another embodiment, a two block buffer configuration is used; however, the channel input buffer 142 is deemed full earlier in the process. Specifically, the channel input buffer 142 is deemed full when there is insufficient room to store two full blocks of data from block buffers 143. During the flow control procedure, a load of data from a block buffer is performed (the block buffer which generated the interrupt that resulted in the initiation of the flow control procedure), and DMAC 135 is re-enabled to receive and transfer data from IEEE 1284 controller to one of the empty block buffers 143 during the flow control procedure (both will be empty at this point, one having just been unloaded into the channel input buffer 142 during the current interrupt, and one empty from the previous interrupt). In this way, data may be able to be received and processed concurrently with the flow control procedure.

In another embodiment, a single block buffer configuration is used. In the single block buffer configuration, DMAC 135 transfers a byte of data at a time from IEEE 1284 controller 110 directly to channel input buffer 142. Upon the transfer an entire data block from IEEE 1284 controller 110 to channel input buffer 142, DMAC 135 issues an interrupt to CPU 150. Unlike the processes described above, no transfer from small buffer to large buffer has to be performed since the data is loaded directly into the channel input buffer. However, CPU 150 must still determine if flow control is pending or needs to be initiated.

Accordingly, after the interrupt is received from DMAC 135, CPU 150 checks the status of flow control state variable 166 to see if flow control is pending. If so, then the shutdown procedure is implemented as described above in conjunction with FIG. 4. If not, CPU checks to see if the channel input buffer 142 has sufficient space to hold at least one more complete block of data. If not, then CPU 150 sets the flow control state variable 166 to pending flow stop. If so, then CPU 150 does not alter the flow control state variable.

In the single buffer configuration, a single block buffer 144 is used as an overflow location for storing RLE data.

During the shutdown procedure described above, if a RLE data transfer is pending, then the shutdown is delayed until receipt of the RLE data byte associated with the pending RLE data transfer. Upon receipt, the interface is shut down (no longer acknowledges receipt of data) and the decompression of RLE data is performed in software. The decompressed data is thereafter stored in the single block buffer 144. Upon restart, the data stored in the single block buffer 144 is transferred into the channel input buffer 142 for processing by CPU 150. In a single block buffer embodiment, block buffer 144 is sized to hold the longest possible run length encoded data transfer.

Alternatively, a single block buffer embodiment may be realized where block buffer 144 is sized to store only the RLE count byte (for number of data bytes remaining to be duplicated) and RLE data byte associated with the interrupted RLE data transfer. In this embodiment, decompression of the RLE data may be performed after the channel input buffer 142 has been emptied prior to restart (therefore obviating the need for a larger temporary storage buffer).

While the present invention has been described with respect to a few specific embodiments, the description is illustrative of the invention and is not to be construed as limiting. Various modifications may occur to those of ordinary skill in the art without departing from the true spirit and scope of the invention as defined by the appended claims.

What is claimed is:

1. A method implemented in a computer for managing the receipt of data through an IEEE 1284 interface controller, comprising the steps of:

(a) transferring data received by the interface controller to a first of a plurality of small capacity buffers;

(b) transferring a data block from the first buffer to a larger capacity buffer for processing by the computer while transferring further data received by the interface controller during the data block transfer to a second of the plurality of small capacity buffers;

(c) checking the larger capacity buffer to determine if it is full;

(d) if so, checking to determine if a run length encoded data transfer is pending; and (e) delaying flow controlling of data through the interface controller until the run length encoded data transfer is complete.

2. The method of claim 1, further comprising the step of:

(b1) after execution of the step of transferring a data block, either (i) setting the interface controller to disable acknowledgment of receipt of data if a flow control status flag indicates pending flow stop; or if not, (ii) setting the flow control status flag to indicate pending flow stop if the large capacity buffer has insufficient space to hold one data block from the plurality of small capacity buffers.

3. The method of claim 2 where the step (b1) (i) of setting the interface controller to disable acknowledgment of receipt of data is delayed if a run length encoded data transfer is pending until an RLE data byte associated with the end of the pending run length encoded data transfer is received by the interface controller.

4. A method implemented in a computer peripheral having an IEEE 1284 interface controller for managing the transfer of data to the interface controller from a host, comprising the steps of:

(a) detecting a condition requiring the computer peripheral to disable the transfer of data to the interface controller; and (b) if a run length encoded data transfer to the interface controller is pending, delaying the disabling of data transfers until a RLE data byte associated with the end of the pending run length encoded data transfer is received by the interface controller.

5. A method of processing data received from a host implementing an IEEE 1284 communications protocol by a peripheral comprising the steps of:

(a) receiving data from the host at an interface controller in the peripheral;

(b) transferring the data from the interface controller to a first of a pair of buffers having a predetermined capacity;

(c) transferring a data block from the first one of the buffers to an input buffer for processing by the peripheral, the input buffer having a larger capacity than the first buffer, while transferring the data received by the interface controller during the data block transfer to a second of the pair of buffers;

(d) just prior to transferring the data block from the first buffer to the input buffer in step (c), checking the status of the input buffer; and (e) if the input buffer has insufficient space to hold more than one data block transfer from the interface controller, disabling the transfer of data from the host to the peripheral.

6. The method of claim 5 wherein the disabling step includes the step of:

checking if a run length encoded data transfer is pending from the host, and if so, delaying disabling of the data transfers from the host to the peripheral until a data byte associated with the run length encoded data is received by the interface controller.

7. A method implemented in a computer peripheral for disabling the generation and transmission of acknowledgment signals for data received from a host, the computer peripheral implementing an IEEE 1284 communications protocol, the method comprising the steps of:

delaying disabling transmission of acknowledgment signals if a run length encoded data transfer is pending from the host, wherein acknowledgment signals are continued to be returned to the host until receipt of an RLE data byte associated with the pending run length encoded data transfer and the subsequent transmission of an acknowledgment signal to the host associated with the RLE data byte, whereby the peripheral is prevented from disabling transmission of acknowledgment signals during a pending run length encoded data transfer so as to prevent the necessity for a complicated recovery associated with an interrupted run length encoded data transfer.

8. A method of processing run length encoded data received from a host implementing an IEEE 1284 communications protocol by a peripheral, comprising the steps of:

receiving run length encoded data including a count byte and data byte from the host;

setting a flag in the peripheral upon receipt of the count byte;

upon receipt of the data byte, transferring data bytes as indicated by the count byte into a first data buffer of a pair of data buffers until the first data buffer is full, each of the pair of data buffers having a predetermined capacity;

clearing the flag upon transferring a last of the number of data bytes;

transferring data from the first data buffer to an input buffer having a larger capacity than the first data buffer while loading incoming data from the host into a second data buffer of the pair of data buffers after the first is full;

if the input buffer is full, controlling the flow of data transfers from the host to the peripheral including delaying flow control if a run length encoded data transfer is pending.

9. The method of claim 8 wherein the controlling the flow of data transfers step includes the steps of:

checking whether the flag is set indicating a pending run length encoded data transfer and receipt of an RLE count byte;

if it is set and an RLE data byte has been received, generating a remaining number of data bytes associated with the RLE data byte as indicated by an associated RLE count byte;

if the RLE data byte has not been received, waiting until receipt of the RLE data byte and generating a plurality of data bytes as indicated by the associated RLE count byte; and disabling acknowledgment of receipt of data transfers from the host to the peripheral.

10. An apparatus for managing the receipt of data by a peripheral device through an IEEE 1284 interface controller from a host, comprising:

a plurality of buffers of a first predetermined capacity for receiving data transferred from the interface controller;

a buffer having a higher capacity than each of the plurality of buffers for storing data for processing by the peripheral device;

means for transferring a data block from one of the plurality of buffers to the higher capacity buffer when the one of the plurality of buffers is deemed full, while transferring further data received by the interface controller during the data block transfer to a second of the plurality of buffers; and a flow controller for disabling receipt of data by the peripheral device and delaying the disabling if a run length encoded data transfer is pending.

11. The apparatus of claim 10 wherein the flow controller disables receipt of data by the peripheral device if a flow control status flag indicates pending flow stop just prior to transferring a data block from the one of the plurality of buffers to the higher capacity buffer, and sets the flow control status flag to indicate pending flow stop if the higher capacity buffer has insufficient space to hold one additional data block from the plurality of buffers.

12. The apparatus of claim 11 further comprising means for delaying the disabling of the receipt of data by the peripheral device if a run length encoded data transfer is pending until a data byte associated with the pending run length encoded data is received by the interface controller.

* * * * *